(12) United States Patent
Wang

(10) Patent No.: US 12,537,049 B2
(45) Date of Patent: *Jan. 27, 2026

(54) APPARATUS FOR PAGE-COPY DATA ACCESSING

(71) Applicant: Piecemakers Technology, Inc., Hsinchu (TW)

(72) Inventor: Gyh-Bin Wang, Hsinchu County (TW)

(73) Assignee: PieceMakers Technology, Inc., Hsinchu (TW)

( * ) Notice: Subject to any disclaimer, the term of this patent is extended or adjusted under 35 U.S.C. 154(b) by 272 days.

This patent is subject to a terminal disclaimer.

(21) Appl. No.: 18/226,228

(22) Filed: Jul. 25, 2023

(65) Prior Publication Data

US 2023/0368834 A1    Nov. 16, 2023

Related U.S. Application Data

(63) Continuation-in-part of application No. 17/476,473, filed on Sep. 15, 2021, now Pat. No. 11,755,685,
(Continued)

(51) Int. Cl.
*G11C 7/10* (2006.01)
*G11C 11/4091* (2006.01)
(Continued)

(52) U.S. Cl.
CPC ...... *G11C 11/4091* (2013.01); *G11C 11/4093* (2013.01); *G11C 11/4094* (2013.01)

(58) Field of Classification Search
CPC ... G11C 11/4096; G11C 11/4094; G11C 5/05; G11C 11/4085; G11C 11/4091
See application file for complete search history.

(56) References Cited

U.S. PATENT DOCUMENTS 5,822,261 A    10/1998 Suh
6,151,242 A    11/2000 Takashima
(Continued)

FOREIGN PATENT DOCUMENTS

CN    106796548 A    5/2017
CN    111338601 A    6/2020
(Continued)

Primary Examiner — Mushfique Siddique
(74) Attorney, Agent, or Firm — Winston Hsu

(57) ABSTRACT

An apparatus for page-copy data accessing is provided, which includes a memory cell array, bit-line sense-amplifier/buffers (BLSABFs), page buffers and a logic operation processing circuit. Data voltage signals on bit-lines in a memory section are transferred to the bit-lines in an adjacent memory section adjacent to the memory section by BLSABFs and the voltage data signals are sequentially propagated across subsequent memory sections through BLSABFs between the subsequent memory sections. The scheme can be applied as a method of page-data write access in a memory chip, of which page data can be propagated sequentially from section to subsequent adjacent section until a target location is reached, and then, activating a word line in a section of the memory comprising target location to write voltages to the memory cells at the target location. The page buffers are configured to receive data voltage signals from the coupled BLSABFs to a data interface.

20 Claims, 15 Drawing Sheets

Related U.S. Application Data which is a continuation-in-part of application No. 17/037,755, filed on Sep. 30, 2020, now Pat. No. 11,250,904.

(60) Provisional application No. 63/403,304, filed on Sep. 2, 2022.

(51) Int. Cl.
    *G11C 11/4093*      (2006.01)
    *G11C 11/4094*      (2006.01)

(56) References Cited

U.S. PATENT DOCUMENTS

| | | | |
|---|---|---|---|
| 6,198,682 | B1 | 3/2001 | Proebsting |
| 6,426,560 | B1 | 7/2002 | Kawamura |
| 8,812,777 | B2 | 8/2014 | Cha |
| 9,767,919 | B1 | 9/2017 | He |
| 9,870,833 | B2 | 1/2018 | Lim |
| 10,152,271 | B1 * | 12/2018 | Willcock .............. G06F 3/065 |
| 10,403,389 | B2 | 9/2019 | Lovett |
| 10,497,428 | B2 | 12/2019 | Kim |
| 10,741,247 | B1 | 8/2020 | Yeh |
| 10,956,813 | B2 * | 3/2021 | Young .................. G11C 11/413 |
| 11,138,499 | B2 * | 10/2021 | Sharma ............... G11C 7/1039 |
| 11,183,231 | B2 | 11/2021 | Wang |
| 2002/0093864 | A1 | 7/2002 | Ooishi |
| 2003/0086288 | A1 | 5/2003 | Sekiguchi |
| 2005/0088881 | A1 | 4/2005 | Miki |
| 2005/0172086 | A1 | 8/2005 | Kawai |
| 2006/0023534 | A1 | 2/2006 | Do |
| 2006/0069851 | A1 | 3/2006 | Chung |
| 2008/0285361 | A1 | 11/2008 | Kim |
| 2009/0168576 | A1 | 7/2009 | Fujita |
| 2011/0069568 | A1 | 3/2011 | Shin |
| 2014/0063955 | A1 * | 3/2014 | Kawase ................ G11C 16/06 |
| | | | 365/185.12 |
| 2014/0185395 | A1 | 7/2014 | Seo |
| 2016/0284390 | A1 | 9/2016 | Tomishima |
| 2017/0109040 | A1 | 4/2017 | Raghu |
| 2019/0042199 | A1 | 2/2019 | Sumbul |
| 2020/0192971 | A1 | 6/2020 | Lue |
| 2021/0125671 | A1 * | 4/2021 | Lue ........................ G11C 16/24 |
| 2021/0157593 | A1 * | 5/2021 | Gu ........................ G06F 9/3802 |

FOREIGN PATENT DOCUMENTS

| | | |
|---|---|---|
| CN | 113707212 | 11/2021 |
| KR | 10-2007-0105141 A | 10/2007 |
| KR | 10-2014-0065319 A | 5/2014 |
| KR | 10-2017-0006976 A | 1/2017 |
| KR | 10-2019-0073781 A | 6/2019 |
| TW | I704569 B | 9/2020 |

* cited by examiner

FIG. 5B

APPARATUS FOR PAGE-COPY DATA ACCESSING

CROSS REFERENCE TO RELATED APPLICATIONS

This application is a continuation-in-part of U.S. application Ser. No. 17/476,473, filed on Sep. 15, 2021, which is a continuation-in-part of U.S. application Ser. No. 17/037,755, filed on Sep. 30, 2020. Further, this application claims the benefit of U.S. Provisional Application No. 63/403,304, filed on Sep. 2, 2022. The contents of these applications are incorporated herein by reference.

BACKGROUND OF THE INVENTION

1. Field of the Invention

The present invention is related to memory management, and more particularly, to an apparatus for page-copy data accessing by using energy efficient and wide data access page-data-copy scheme.

2. Description of the Prior Art

A conventional semiconductor memory block may be arranged to store data, and maximizing a goal of high bandwidth access may be regarded as one of some important considerations regarding memory block design. However, some problems may occur in prior art schemes of data access. For example, there may be a tradeoff between a prefetch number of a data access, overall power consumption, normalized access energy efficiency (i.e. per-bit access energy) and the memory block area. More particularly, without significantly increasing the memory block area, conventional cell array architecture of a memory block may have reached a limitation of the prefetch number. Thus, a novel architecture and method of data access is needed to solve the problem.

SUMMARY OF THE INVENTION

It is therefore an objective of the present invention to provide an apparatus for page-copy data accessing by using energy efficient and wide data access page-data-copy scheme to solve the abovementioned problem.

A novel apparatus for page-data read access is provided. The apparatus for page-copy data accessing, comprising: a memory cell array, divided into a plurality of memory sections, each memory section comprising a plurality of memory cells which are partitioned into multiple pages and each page of memory cells is coupled by a corresponding word line and the data in a group of memory cells coupled by a word line is a page-data, a plurality of bit-line sense-amplifier/buffers (BLSABFs), coupled to a the memory cell array through a plurality of bit-lines or bit-line pairs, each BLSABF being coupled to two bit-lines or bit-line pairs located in the two different memory sections on opposite sides of the BLSABF, data voltage signals on the bit-lines or bit-line pairs in a memory section, by the signal sensing and buffering performed by the plurality of BLSABFs, are transferred to the bit-lines or bit-line pairs in an adjacent memory section adjacent to the memory section, a page-data, in a form of voltage data signals are sequentially propagated across a plurality of subsequent memory sections through a plurality of BLSABFs between the plurality of subsequent memory sections; and a plurality of page buffers, coupled to all of or part of the plurality of BLSABFs, and configured to receive the page-data voltage signals from the coupled BLSABFs to a data interface of the apparatus, or configured to store data voltage signals from the data interface of the apparatus to the coupled BLSABFs.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5B illustrates replacement of multiplication by addition when multiplying vectors according to an embodiment of the present invention.

DETAILED DESCRIPTION

Figure 1:
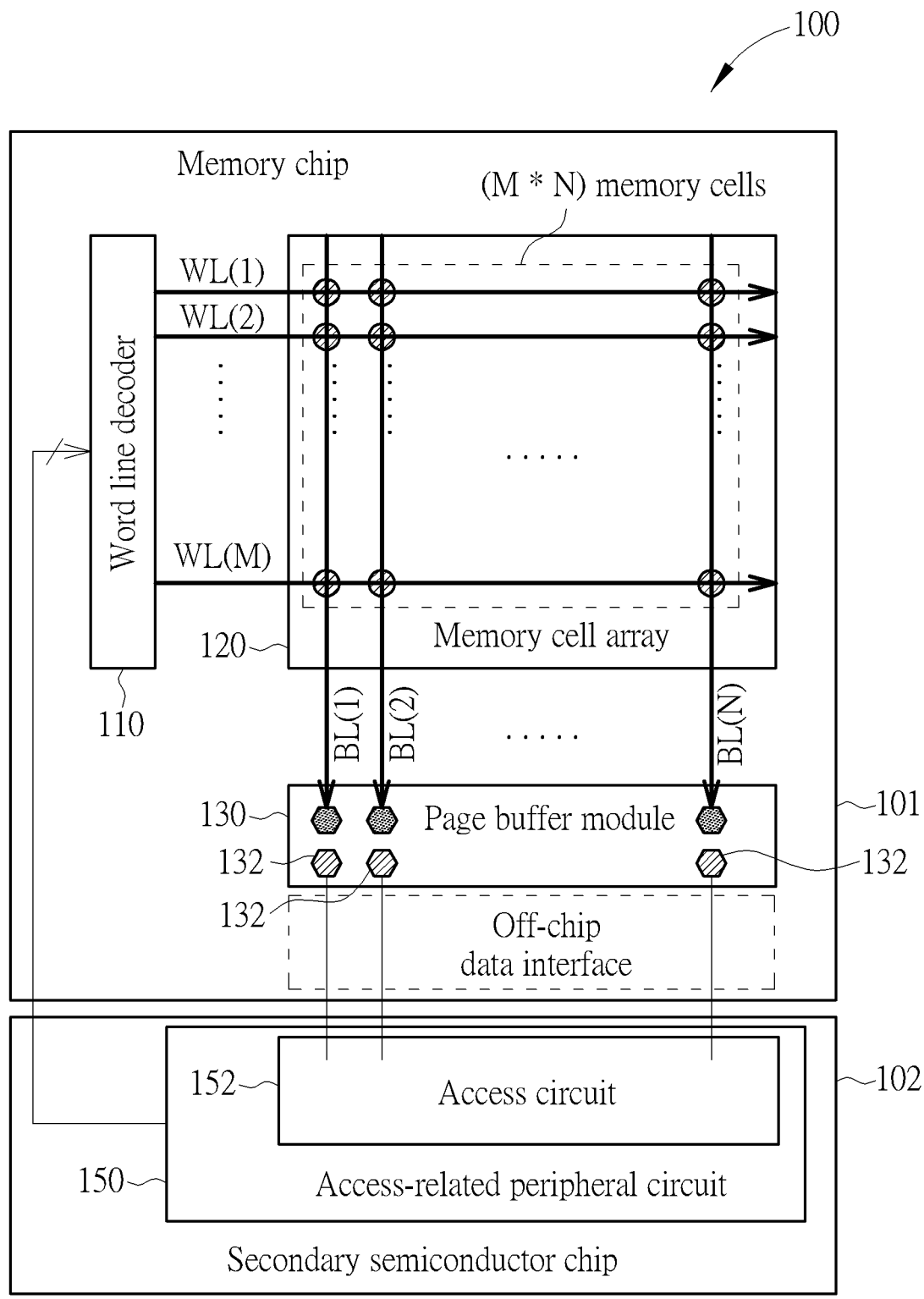
FIG. 1 is a schematic diagram of an apparatus for enhancing data access in a memory module according to an embodiment of the present invention.

FIG. 1 is a schematic diagram of an apparatus for enhancing data access (e.g. read/write/move) in a memory module 100 according to an embodiment of the present invention. For example, the memory module 100 may include static-random-access memory (SRAM), dynamic random access memory (DRAM), flash memory, magneto-resistive random-access-memory (MRAM), ferroelectric random-access memory (FeRAM) or Resistive Random Access Memory (RRAM), where the apparatus may comprise at least one portion (e.g. a portion or all) of the memory module 100. For example, the apparatus may comprise partial memory architecture of the memory module 100. For another example, the apparatus may comprise a combination of the partial memory architecture and associated control mechanism. For yet another example, the apparatus may comprise the whole of the memory module 100.

As shown in FIG. 1, the memory module 100 may comprise a memory bank 101 and a secondary semiconductor chip 102, and the memory bank 101 may comprise a word line decoder 110, a memory cell array 120 comprising a plurality of memory cells such as (M*N) memory cells (e.g. M and N may represent positive integers, respectively), and a plurality of bit lines or bit-line pairs and a plurality of word lines that are respectively coupled to the memory cell array 120, such as N bit lines {BL(1), BL(2), . . . , BL(N)} or bit-line pairs and M word lines {WL(1), WL(2), . . . , WL(M)} coupled to the (M*N) memory cells, but the present invention is not limited thereto. According to some embodiments, except for word line drivers, the word line decoder 110 can be, in part at least, implemented in the secondary semiconductor chip 102. For example, a word line decoder pre-stage of the word line decoder 110 may be implemented on the secondary semiconductor chip 102 and a word line decoder end-stage (which may comprise the word line drivers) of the word line decoder 110 may be implemented on the memory bank 101.

The memory bank 101 may further comprise a plurality of bit-line sense amplifier/buffers (BLSABFs) coupled to the memory cell array 120 through the plurality of bit lines, respectively, such as N BLSABFs of a page buffer module 130. The memory bank 101 may further comprise a plurality of page buffers, coupled to all of or part of the plurality of BLSABFs, such as page buffers of the page buffer module 130, and a plurality of main data lines coupled to the PBCs of the page buffer module 130, where the plurality of main data lines may serve as an off-chip data interface of the memory bank 101. For example, the secondary semiconductor chip 102 may be electrically connected to the memory bank 101 through direct face-to-face attachment, but the present invention is not limited thereto. In addition, the secondary semiconductor chip 102 may comprise an access-related peripheral circuit 150, and the access-related peripheral circuit 150 may comprise an access circuit 152. For example, the secondary semiconductor chip 102 may comprise a plurality of secondary amplifiers positioned in the access circuit 152. The plurality of page buffers are configured to receive data voltage signals from the coupled BLSABFs and propagate the data voltage signals to the off-chip data interface (e.g., logic operation processing circuit) of the apparatus, or configured to store data voltage signals from the off-chip data interface of the apparatus to the coupled BLSABFs.

The memory cell array 120 may be arranged to store data for a host system, and the memory module 100 may be installed in the host system. Examples of the host system may include, inter alia, a multifunctional mobile phone, a tablet computer, and a personal computer such as a desktop computer and a laptop computer. The memory cell array 120 may include static-random-access memory (SRAM) cells, dynamic random access memory array (DRAM) cells, flash memory cells, magneto-resistive random-access memory (MRAM) cells, ferroelectric random-access memory (FeRAM) cells, Resistive random-access memory (RRAM) cells, or any other kind of memory cells. The plurality of bit lines or bit-line pairs such as the N bit lines or bit-line pairs {BL(1), BL(2), . . . , BL(N)} or {BL(1)/BLF(1), BL(2)/BLF(2), . . . , BL(N)/BLF(N)} and the plurality of word lines such as the M word lines {WL(1), WL(2), . . . , WL(M)} may be arranged to perform access control of the memory cell array 120. Data in a group of memory cells coupled by a word line is a page-data. According to this embodiment, the plurality of BLSABFs may be arranged to sense a plurality of bit-line signals restored from the plurality of memory cells such as the (M*N) memory cells, and convert the plurality of bit-line signals into a plurality of amplified signals, respectively.

Regarding the architecture shown in FIG. 1, the apparatus may comprise the memory bank 101 that is positioned in the memory module 100, but the present invention is not limited thereto. For example, the apparatus may further comprise the secondary semiconductor chip 102. According to some embodiments, in addition to the memory bank 101, the memory module 100 may comprise at least one portion (e.g. a portion or all) of the secondary semiconductor chip 102. For example, one or more other circuits with any functionalities outside the memory module 100 may be integrated into the secondary semiconductor chip 102.

According to some embodiments, the architecture shown in FIG. 1 may vary. For example, the memory cell array 120 may be divided into a plurality of cell array (CA) sections according to a predetermined bit-line length, for enhancing the access speed, and the plurality of BLSABFs (e.g. the N BLSABFs in the page buffer 130) may be divided into a plurality of BLSABF sections coupled to the plurality of cell array sections, correspondingly, for performing the associated sensing operations.

Figure 2:
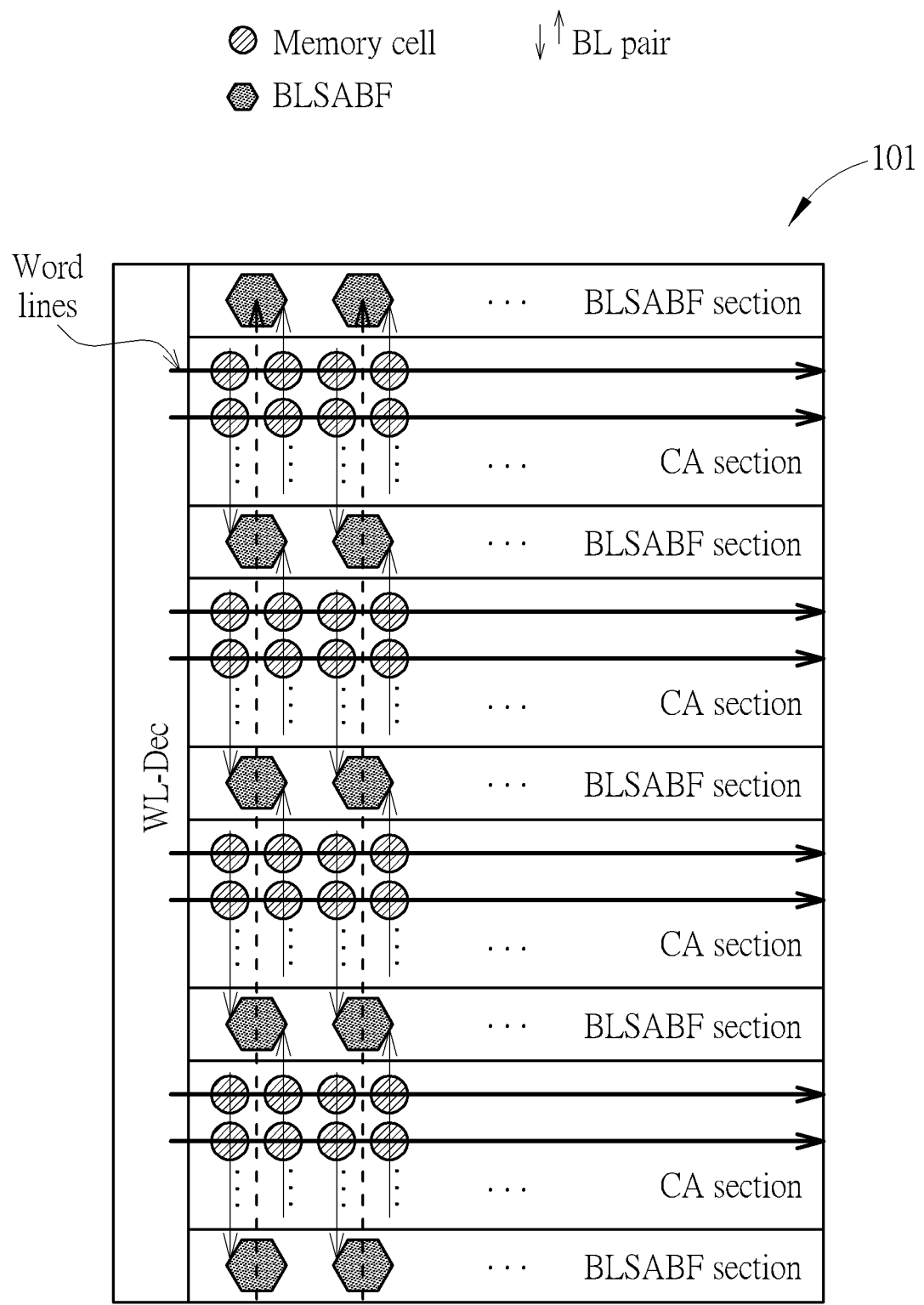
FIG. 2 illustrates some cell array sections alternating with some BLSABF sections of the memory module shown in FIG. 1 according to an embodiment of the present invention.

FIG. 2 illustrates some cell array sections alternating with some BLSABF of the memory module shown in FIG. 1 according to an embodiment of the present invention. The CA sections and the BLSABF sections in the architecture shown in FIG. 2 may be taken as examples of the plurality of cell array sections and the plurality of BLSABF sections mentioned above. In addition, any two of the CA sections may be the same or similar to each other (with different bit-line length or different number of cells per bit line), and any two of the BLSABF sections may be the same or similar to each other.

Figure 3A:
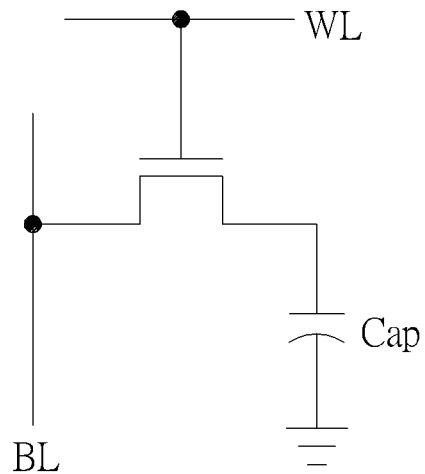
FIG. 3A illustrates a 1T1C DRAM memory cell of the memory module shown in FIG. 1 according to an embodiment of the present invention.
Figure 3B:
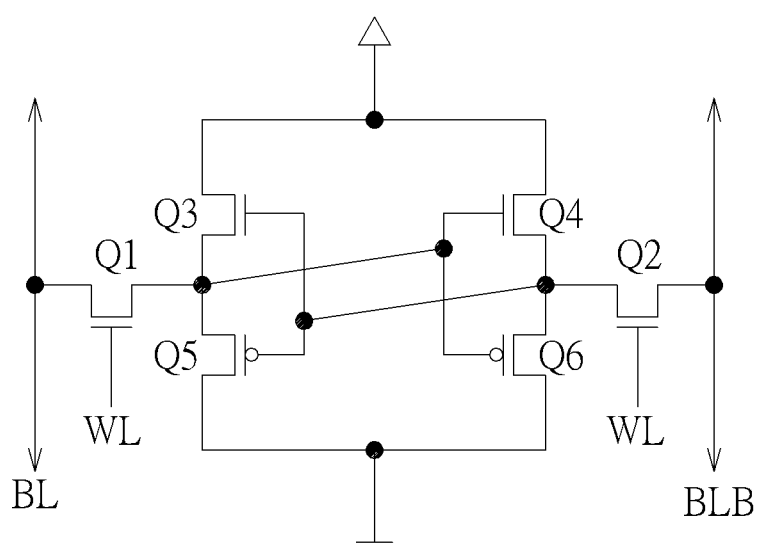
FIG. 3B illustrates a 6T SRAM memory cell of the memory module shown in FIG. 1 according to an embodiment of the present invention.

FIG. 3A illustrates a 1T1C (one transistor, one capacitor) DRAM cell. This memory cell may be taken as an example of any memory cell (e.g. each memory cell) of the plurality of memory cells of the memory cell array 120. As shown in FIG. 3A, the memory cell may comprise a switch transistor coupled to a certain word line (WL) (e.g. the word line WL (m)) of the plurality of word lines and a certain bit line (BL) (e.g. the bit line BL(n)) of the plurality of bit lines, and comprise a capacitor Cap. The capacitor Cap may be arranged to store electric charge, and different states of the electric charge may indicate a bit of information (e.g. 0 or 1), but the present invention is not limited thereto. Some embodiments may also utilize a 2T2C (two transistor, two capacitor) memory cell. Those in the art know normal structure and functioning of a 2T2C memory cell. FIG. 3B illustrates a 6T (six transistors) memory cell (for example, in a form of SRAM cell) of the memory module 100 shown in FIG. 1 according to an embodiment of the present invention. This memory cell may be taken as an example of any memory cell (e.g. each memory cell) of the plurality of memory cells of the memory cell array 120. As shown in FIG. 3B, the memory cell may comprise transistors Q1 to Q6. The transistors Q1 and Q2 are coupled to a certain word line (WL) (e.g. the word line WL(m)) of the plurality of word lines and a certain pair of bit line (e.g. bit line BL(n) and bit line BLB(n)) of the plurality of bit line pairs for accessing or storing data in the memory cell.

Figure 4:
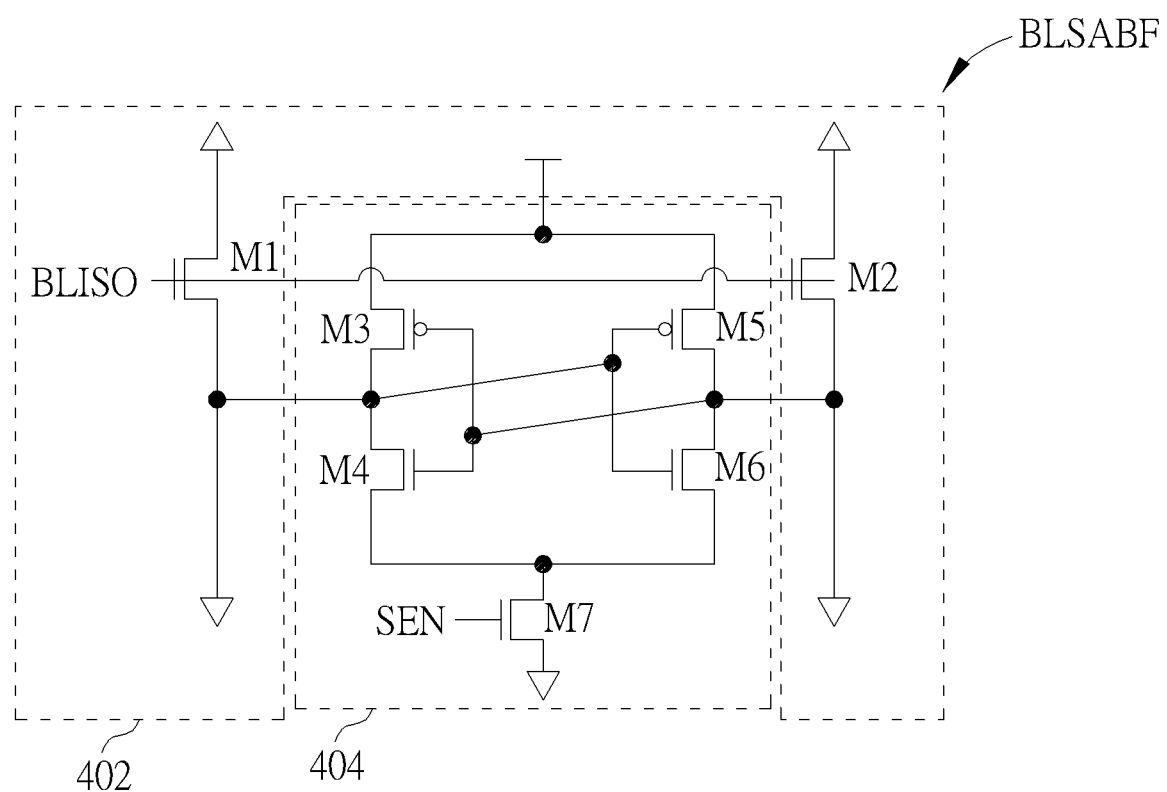
FIG. 4 illustrates a BLSABF of the memory module shown in FIG. 1 according to an embodiment of the present invention.

FIG. 4 is a schematic diagram illustrating a BLSABF of the memory module 100 shown in FIG. 2 according to an embodiment of the present invention. Data in memory cells coupled by a corresponding word line may refer to page-data. The BLSABF is coupled to two bit-lines or bit-line pairs located in the two different CA sections on opposite sides of the BLSABF (e.g. two CA sections adjacent to a certain BLSABF section comprising this BLSABF). Through signal sensing and buffering performed by the BLSABF, page-data, in a form of data voltage signals on the bit-lines or bit-line pairs in a CA section may be transferred to the bit-lines or bit-line pairs in an adjacent CA section. As such, the voltage data signals may be sequentially propagated across a plurality of subsequent CA sections through a plurality of BLSABFs between the plurality of subsequent CA sections.

The BLSABF may operate according to a propagating control signal BLISO and a sensing or latch control signal SEN, to obtain respective bit information (voltages), where the memory module 100 (e.g. the memory bank 101) may select any of the plurality of memory cells according to the access control signals of the word line decoder 110. For example, in a first phase of a read phase, the BLSABF may obtain the bit information of a first memory of two memory cells through a first bit-line or first bit-line pair, and more particularly, amplify a signal carrying the bit information of the memory cell. For another example, in a second read phase of these read phases, the BLSABF may obtain the bit information of a second memory cell of the two memory cells through the a second bit line or second bit line pair, and more particularly, amplify a second signal carrying the bit information of the second memory cell.

Control of the BLSABFs is managed by the propagating control signal BLISO and the sensing or latch control signal SEN. Because the application is directed toward movement of data of a page at a time, where a page is defined as data stored in all memory cells activated by a same single word line, column select lines are not necessary. Instead, by sequentially activating adjacent BLSABF sections, data present in a first BLSABF will be copied to a next sequential BLSABF. In embodiments of the application, a page of data can be propagated from a source location to a target location in either direction perpendicular to the word lines.

For example, voltages loaded onto the bit lines or bit-line pairs in a first CA section may be latched by enabling the BLSABF between the first section and a second section adjacent to the first section causes latched voltages to propagate to bit lines or bit-line pairs in the second section. Voltages propagated to the bit lines or bit-line pairs in the second section using the latches between the second section and a third section different than the first section and adjacent to the second section cause the latched voltages to propagate to bit lines or bit-line pairs in the third section. Using this method of sequentially activating BLSABFs, voltages can be propagated sequentially from section to subsequent adjacent section until a target location is reached. Voltages may be loaded onto the bit lines or bit-line pairs by activating the appropriate word line to read source voltages or source voltages may be provided by the data access circuit 152.

Thus, a read activates the word line at the source location loading voltages from the memory cells at the source location onto the corresponding bit lines or bit-line pairs where they may be latched through activation of the adjacent BLSABF. From there, voltages may be propagated sequentially from section to subsequent adjacent section until a target location is reached, whether the target location is the data access circuit 152 or another CA section in the case of a move. A write requires activation of the word line of the target section once the data has been moved to the bit lines or bit-line pairs of that target section to store the data into the associated memory cells. The write access of a data to a memory cell, which is associated to a word line in a memory section, comprising the timing sequence that a data voltage signal has been driven to a bit-line or bit-line pair before activating of the associated word line.

Please further refer to FIG. 4. The BLSABF includes a propagating control circuit 402 and a latch circuit 404. The propagating control circuit 402 is coupled to a bit-line pair in a CA section and a bit-line pair in an adjacent CA section adjacent to the CA section. For example, when applied to the memory cell/array with differential bit-line mechanism, the propagating control circuit 402 may be coupled to a bit-line pair in the CA section and a bit-line pair in the adjacent CA section adjacent to the CA section. When applied to the memory cell/array with single bit-line mechanism, the propagating control circuit 402 may be coupled to a bit-line in the CA section and a bit-line in the adjacent CA section. The propagating control circuit 402 is configured to transfer a data voltage signal in the CA section to a bit-line or bit-line pair in the adjacent CA section in response to a propagating control signal BLISO. The propagating control circuit 402 is configured to transfer data voltage signals in the CA section to the bit-line or bit-line pair in the adjacent CA section in response to a propagating control signal BLISO. The latch circuit 404 is coupled to the bit-line or bit-line pair in the CA section and/or the adjacent CA section, and configured to sense the data voltage signal and latch the sensed/amplified data voltage signal in response to a sensing or latch control signal SEN, such that the latched data voltage signal may propagate to bit-line or bit-line pair in the adjacent CA section. In the same way, voltage signals propagated to the bit lines in the second CA section can be propagated further to the third CA section using the latches between the second CA section and a third CA section. In addition, the bit-line or bit-line pair in the CA section may be pre-charged to a first supply voltage before a word line in the CA section is activated or before a data voltage signal is transferred from a neighboring or the second CA section through the propagating control circuit 402 associated with the bit-line or bit-line pair in the neighboring or second CA section.

For example, when the propagating control signal BLISO of the BLSABF is activated, the propagating control circuit 402 is configured to sense the data voltage signal driven on the bit-line or bit-line pair in the CA section and transfer the data voltage signal onto the bit-line or bit-line pair in the adjacent CA section during a propagating period. When the sensing or latch control signal SEN of the BLSABF is activated, the first latch circuit 404 of the BLSABF is configured to latch the sensed/amplified data voltage signal during a sensing or latch period. In other words, through the signal sensing and buffering performed by the propagating control circuit 402 and the latch circuit 404, data voltage signals on the bit-lines or bit-line pairs in the CA section may be transferred to the bit-lines or bit-line pairs in the adjacent CA section. As such, the voltage data signals may be sequentially propagated across a plurality of subsequent CA sections through a plurality of BLSABFs between the plurality of subsequent CA sections.

In an embodiment, as shown in FIG. 4, the propagating control circuit 402 includes transistors M1 and M2. The transistors M1 and M2 may be MOS transistors or other devices having similar functions. For example, the transistors M1 and M2 may be n-type metal oxide semiconductor transistors (NMOSs). The drain terminals of the transistors M1 and M2 are coupled to the bit-line-pair of the memory cell in a first CA section to transfer data voltage signals. The gate terminals of the transistors M1 and M2 are controlled by the propagating control signal BLISO. The source terminals are coupled to the bit-line or bit-line pair of the memory cell in a second CA section adjacent to the first CA section. In addition, when applied to the memory cell array with differential bit-line mechanism, the transistors M1 and M2 of the propagating control circuit 402 may be coupled to the bit-line pairs in the first CA section and the second CA section. When applied to the memory cell array with single bit-line mechanism, one of the transistors M1 and M2 of the propagating control circuit 402 coupled to the bit-line in the first CA section and the other transistor of the propagating control circuit 402 coupled to the bit-line in the second CA section. When the propagating control signal BLISO of the BLSABF is enabled, the sensing control of the BLSABF is enabled and the propagating control circuit 402 is configured to sense the data voltage signal via the bit-lines in the first CA section, and then transfer the sensed/amplified data voltage signal onto the bit-lines in the second CA section during a propagating period.

The latch circuit 404 includes transistors M3-M7. The transistors M3-M7 may be MOS transistors or other devices having similar functions. For example, the transistors M3 and M5 may be p-type metal oxide semiconductor transistors (PMOSs). The transistors M4, M6 and M7 may be NMOS transistors. The source terminals of the transistors M3 and M5 are coupled to a power supply voltage. The gate terminal of the transistor M3 is coupled to the gate terminal of the transistor M4. The drain terminal of the transistor M3 is coupled to the drain terminal of the transistor M4 and the bit-line of the memory cell in a first CA section and a drain/source terminal of the MOS of the propagating control circuit, which is coupled to the second CA section. The gate terminal of the transistor M5 is coupled to the gate terminal of the transistor M6 and the drain terminal of the transistor M3. The drain terminal of the transistor M5 is coupled to the drain terminal of the transistor M6, the gate terminal of the transistor M3 and the bit-line of the memory cell in a first CA section and a drain/source terminal of the MOS of the propagating control circuit, which is coupled to the second CA section. The source terminal of the transistor M6 is coupled to the source terminal of the transistor M4 and the drain terminal of the transistor M7. The gate terminal of the transistor M7 is controlled by the sensing or latch control signal SEN. The data voltage signal has been transferred onto the bit-lines in the second CA section by the propagating control circuit 402 during a propagating period. When the sensing or latch control signal SEN of the BLSABF is enabled, the latch circuit 404 of the BLSABF may operate as a data buffer for transmitting the data voltage signal onto the bit-lines in the second CA section. Therefore, through signal sensing and buffering performed by the BLSABF, data voltage signals on the bit-lines or bit-line pairs in the first CA section may be transferred to the bit-lines or bit-line pairs in the second CA adjacent to the first CA section.

Figure 5A:
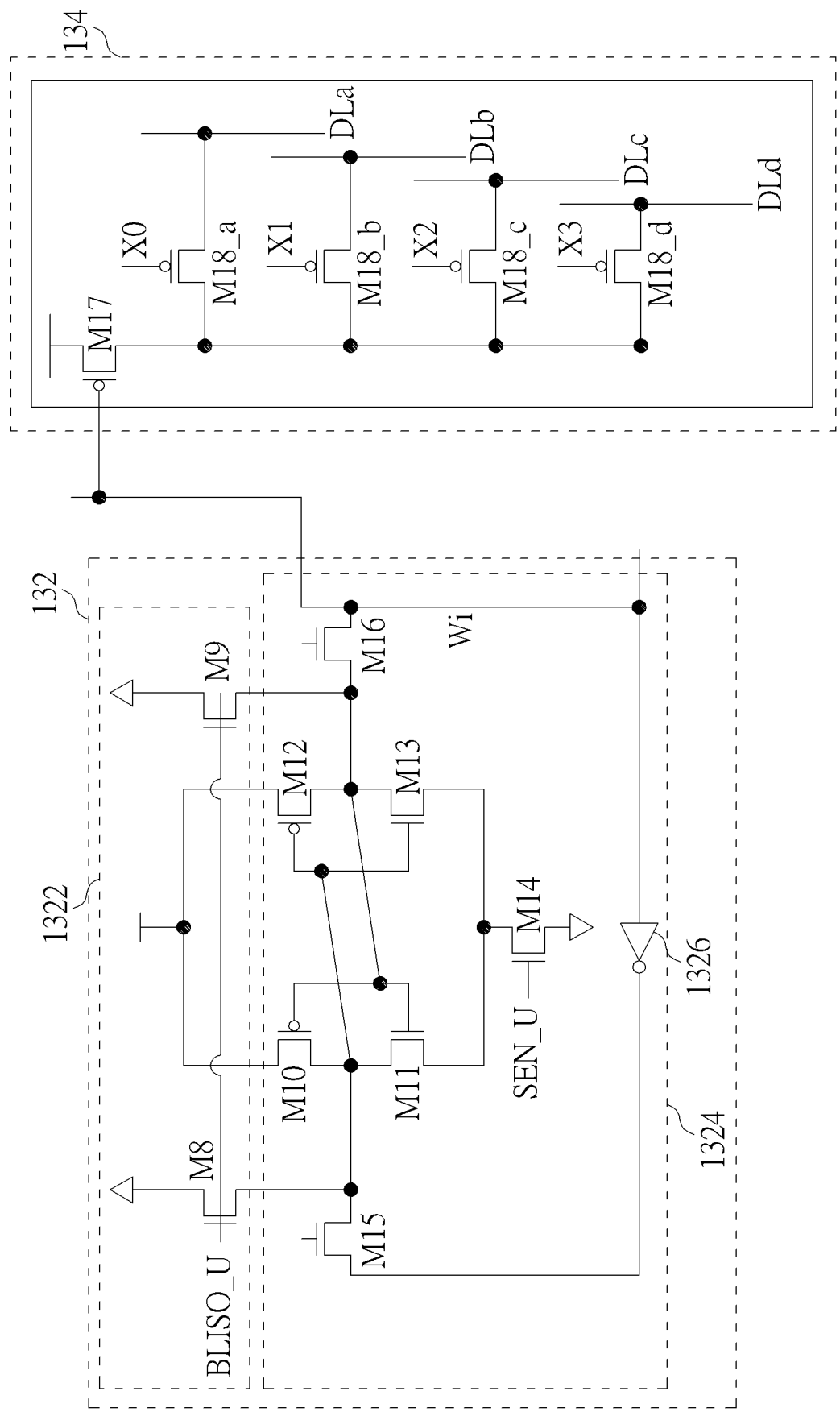
FIG. 5A illustrates a page buffer of the memory module shown in FIG. 1 according to an embodiment of the present invention.

FIG. 5A a schematic diagram illustrating a page buffer 132 of the memory module 100 shown in FIG. 1 according to an embodiment of the present invention. The page buffer 132 is coupled to a bit line or bit-line pair and the off-chip data interface. The page buffer 132 is configured to receive data voltage signals from the coupled bit line or bit-line pair as a BLSABF and output the data voltage signals to the off-chip data interface of the apparatus. The page buffer 132 is configured to store data voltage signals from the off-chip data interface to the coupled bit line or bit-line page. As shown in FIG. 5A, the page buffer 132 includes a signal-pass control circuit 1322 and a buffer circuit 1324. The signal-pass control circuit 1322 is coupled to a bit-line or bit-line pair which is coupled to a BLSABF. For example, the signal-pass control circuit 1322 is coupled to a bit-line or bit-line pair which is coupled to a last stage of a plurality of BLSABFs. The signal-pass control circuit 1322 is configured to sense or transfer data voltage signals from/to the coupled BLSABF through the bit-line or bit-line pair of the coupled BLSABF in response to a signal-pass control signal BLISO_U. The buffer circuit 1324 is coupled to the signal-pass control circuit 1322, and configured to latch the sensed/amplified data voltage signal in response to a sensing/latch control signal SEN_U.

For example, when the signal-pass control signal BLISO_U of the page buffer 132 is activated, the signal-pass control circuit 1322 is configured to transfer the data voltage signal from the bit-line or bit-line pair coupled to the last stage of the plurality of BLSABFs to the buffer circuit 1324 or transfer the data voltage signal to the last stage of the plurality of BLSABFs via the bit-line or bit-line pair coupled to the last stage of the plurality of BLSABFs during a signal-pass period. When the sensing/latch control signal SEN_U of the page buffer 132 is activated, the buffer circuit 1324 is enabled and configured to latch the sensed/amplified data voltage signal in response to the sensing/latch control signal during a sensing/latch period. In other words, through the signal transferring and buffering performed by the signal-pass control circuit 1322 and the buffer circuit 1324, the page buffer 132 may receive and sense the data voltage signals from the coupled BLSABF via the bit-line or bit-line pair coupled to the last stage of the plurality of BLSABFs and stored the data voltage signal. The page buffer 132 may also transfer data voltage signal to the coupled BLSABF via the bit-line or bit-line pair coupled to the last stage of the plurality of BLSABFs.

In an embodiment, as shown in FIG. 5A, the signal-pass control circuit 1322 includes transistors M8 and M9. The transistors M8 and M9 may be MOS transistors or other devices having similar functions. For example, the transistors M8 and M9 may be NMOS transistors. The drain terminals of the transistors M8 and M9 are coupled to the bit-line or bit-line pair which is coupled to the last stage of the plurality of BLSABFs and configured to transfer the data voltage signal. The gate terminals of the transistors M8 and M9 are controlled by the signal-pass control signal BLISO_U. The source terminals of the transistors M8 and M9 are coupled to the buffer circuit 1324. For example, when the signal-pass control signal BLISO_U is enabled, the signal-pass control circuit 1322 is configured to sense the data voltage signal via the bit-lines coupled to the last stage of the plurality of BLSABFs.

The buffer circuit 1324 includes transistors M10-M16 and an inverter 1326. The transistors M10-M16 may be MOS transistors. For example, the transistors M10 and M12 may be PMOS transistors. The transistors M11 and M13-M16 may be NMOS transistors. The source terminals of the transistors M10 and M12 are coupled to a power supply voltage. The gate terminal of the transistor M10 is coupled to the gate terminal of the transistor M11. The drain terminal of the transistor M10 is coupled to the drain terminal of the transistor M11. The gate terminal of the transistor M12 is coupled to the gate terminal of the transistor M13 and the drain terminal of the transistor M10. The drain terminal of the transistor M12 is coupled to the drain terminal of the transistor M13 and the gate terminal of the transistor M10. The source terminal of the transistor M13 is coupled to the source terminal of the transistor M11 and the drain terminal of the transistor M14. The gate terminal of the transistor M14 is controlled by the sensing/latch control signal SEN_U. When the sensing/latch control signal SEN_U is enabled, the buffer circuit 1324 may operate as a latch for latching the data voltage signal sensing by the signal-pass control circuit 1322.

Figure 6:
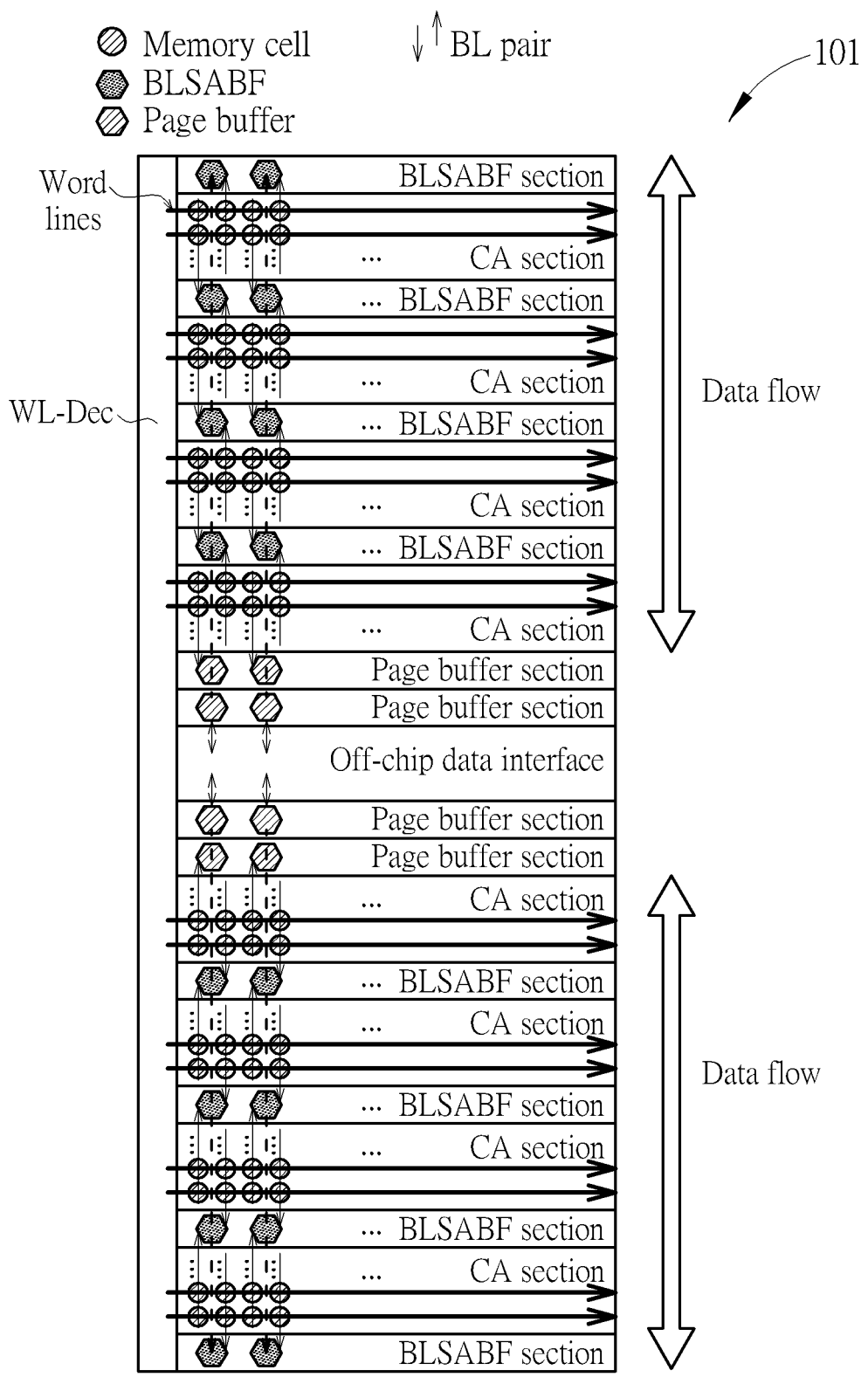
FIG. 6 is a schematic diagram illustrating an example of dataflow of the memory module according to an embodiment of the present invention.

FIG. 6 is a geometric or layout view illustrating an example of dataflow of the memory module 100 according to an embodiment of the present invention. As shown in FIG. 6, the BLSABF sections may be considered as data signal buffer or repeater between two adjacent CA sections. Data voltages may be propagated sequentially from CA section to subsequent adjacent CA section through the corresponding BLSABF until a target location is reached. That is, the voltage data signals may be sequentially propagated across a plurality of subsequent memory sections through a plurality of BLSABFs between subsequent memory sections. The page buffer may access data in either the coupled BLSABF or the off-chip data interface. The page buffer may receive data voltage signals from the coupled BLSABF section and transfer the data voltage signals to the off-chip data interface of the apparatus. The page buffer may receive data voltage signals from the off-chip data interface of the apparatus and propagate the data voltage signals and store the data voltage signals to the coupled BLSABF section.

Figure 7:
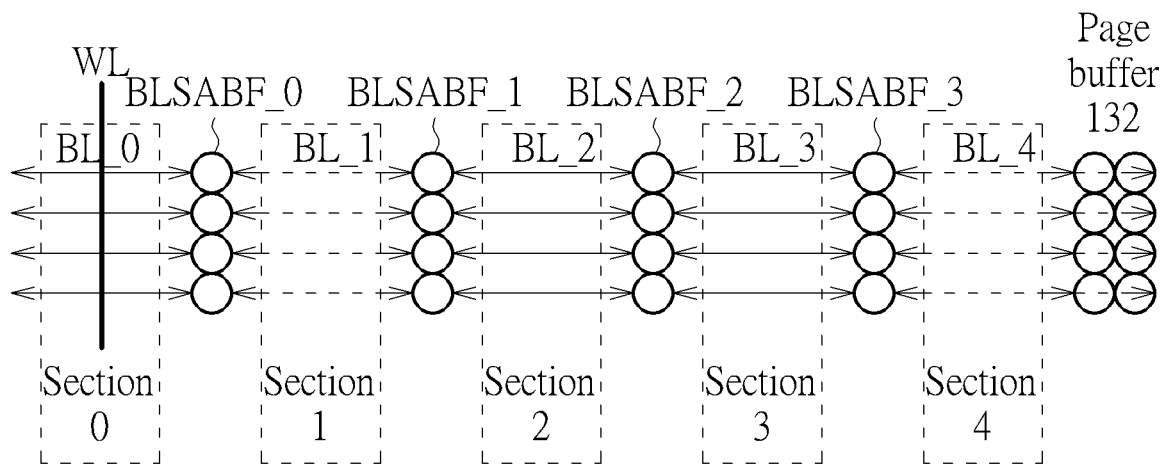
FIG. 7 is a schematic diagram illustrating the disclosed inter-section page-data-copy scheme according to an embodiment of the invention.
Figure 7:
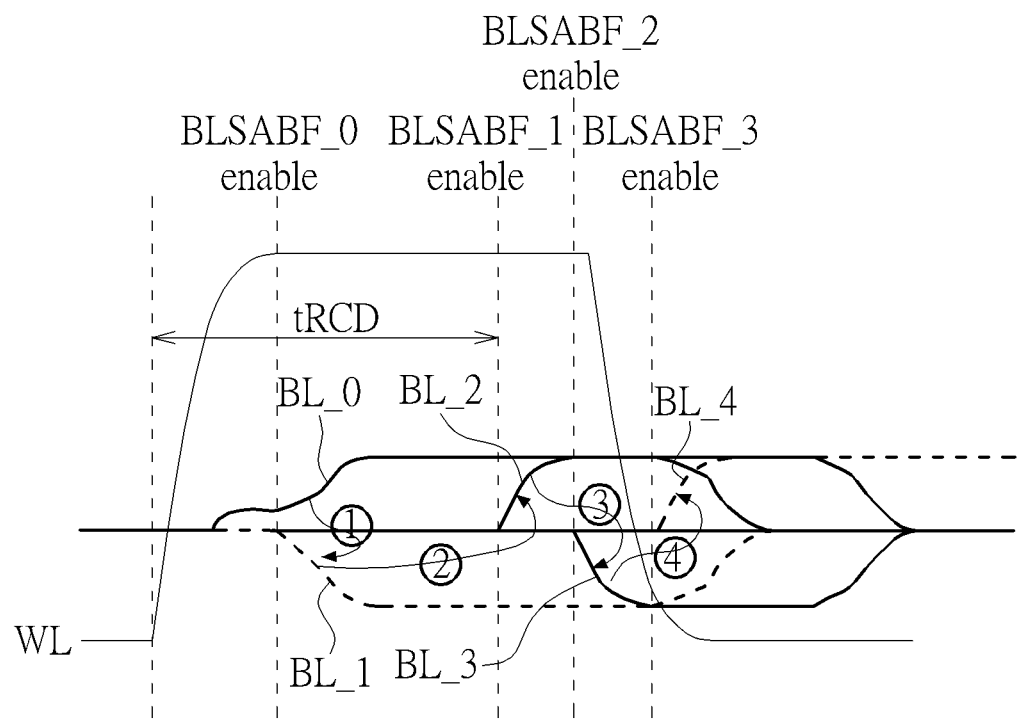
Figure 8:
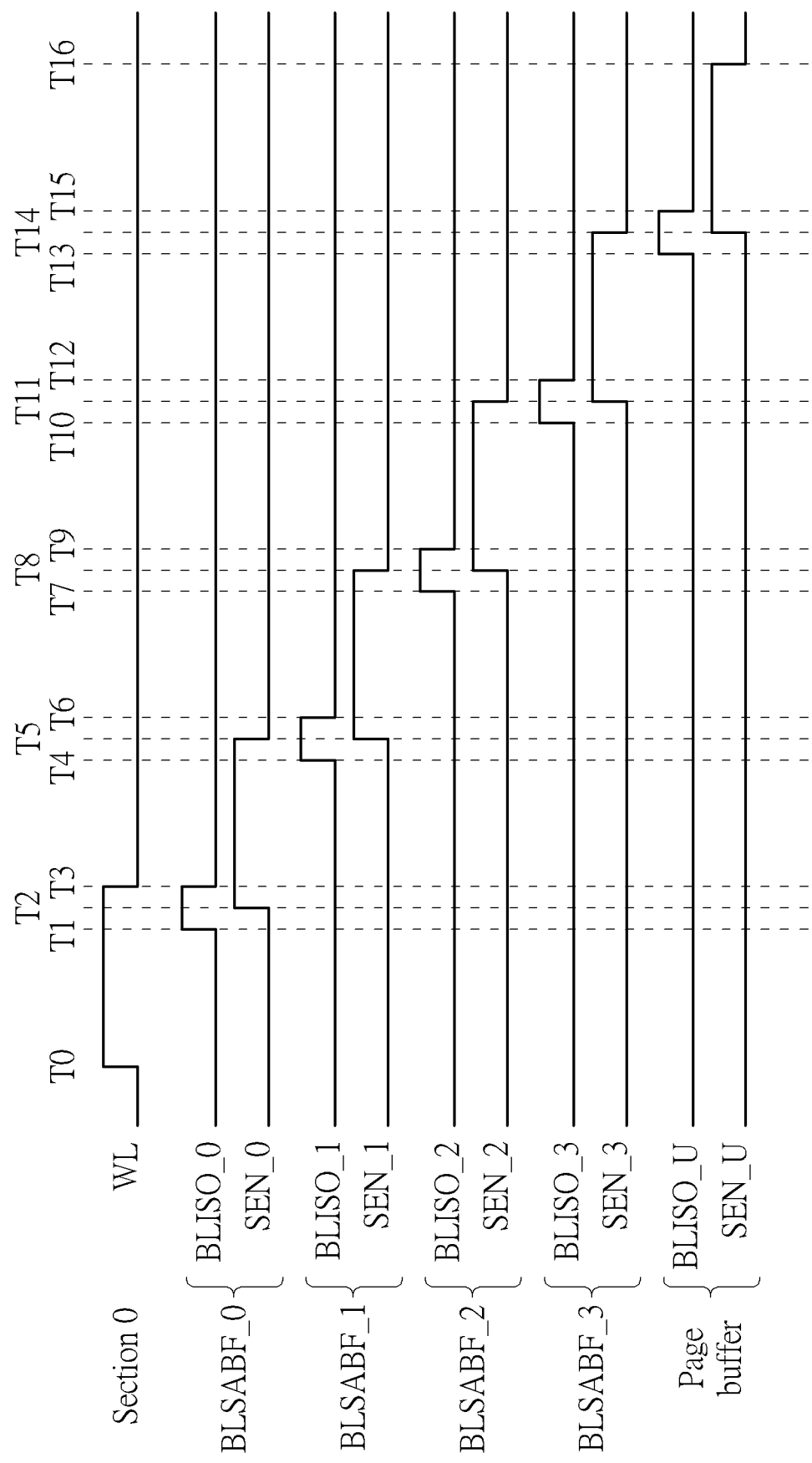
FIG. 8 is a waveform diagram of the operations of the CA sections, BLSABFs and the page buffer shown in FIG. 7 according to an embodiment of the invention.

FIG. 7 is a schematic diagram illustrating the disclosed inter-section page-data-copy scheme according to an embodiment of the invention. FIG. 8 is a waveform diagram of the operations of the CA sections, BLSABFs and the page buffer 132 shown in FIG. 7 according to an embodiment of the invention. The top half of FIG. 7 shows a functional view of a portion of an example memory bank. The CA sections are outlined in dotted lines and numbered 0-4. Each CA section contains a plurality of word lines, although only one is shown in FIG. 7. A BLSABF is disposed between each two of the CA sections, and each BLSABF is connected to the two adjacent CA sections via bit lines or bit line pairs. For example, the BLSABF_0 is coupled to the bit-line (or bit-line pair) BL_0 located in the CA section 0 and coupled to the bit-line (or bit-line pair) BL_1 located in the CA section 1, the BLSABF_1 is coupled to the bit-line (or bit-line pair) BL_1 located in the CA section 1 and coupled to the bit-line (or bit-line pair) BL_2 located in the CA section 2, and the like. A page buffer 132 is couple to the BLSABF_3 through the bit line or bit line pair BL_4 in the CA section 4. Each of the BLSABF_0-BLSABF_3 has similar structures, operations and functions as the BLSABF shown in FIG. 4. The page buffer 132 has similar structures, operations and functions as the page buffer 132 shown in.

Please further refer to FIG. 7 and FIG. 8. At time T0, the word line WL associated with the CA section 0 is activated, and voltage signals on bit-lines (or bit-line pairs) in the CA section 0 then are developed. At time T1, a propagating control signal BLISO_0 of the BLSABF_0 is enabled (e.g., BLISO_0 is VDD), and then sensing control of the BLSABF_0 is enabled, and the propagating control circuit of the BLSABF_0 is configured to pass the data voltage signal from the memory cell of the CA section 0 coupled to the word line WL to the bit-line BL_0 (or bit-line pair BL_0/BLf_0) in the CA section 0 to the bit-line BL_1 (or bit-line pair BL_1/BLf_1) in the CA section 1, and then sense/amplify the data voltage signal, and then sensed/amplified data voltage signal onto the bit-line BL_1 (or bit-line pair BL_1/BLf_1) in the CA section 1 during a first propagating period (e.g., from period T1 to T3). At time T2, a sensing or latch control signal SEN_0 of the BLSABF_0 is enabled (e.g., SEN_0 is VDD), and the latch circuit of the BLSABF_0 is configured to sense/amplify/latch the data voltage signal during a first sensing or latch period (e.g., from period T2 to T5). The BLSABF_0 is enabled, and the data voltage signal is transferred from the bit-line BL_0 (or bit-line pair BL_0/BLf_0) in the CA section 0 to the bit-line BL_1 (or bit-line pair BL_1/BLf_1) in the CA section 1, and the sensed/amplified data voltage signal from the bit-line BL_0 (or bit-line pair BL_0/BLf_0) in the CA section 0 may be latched in the latch circuit of the BLSABF_0 during the first sensing or latch period. As such, page data is sensed out from the memory cells of the open word line WL also copied from the CA section 0 to the BLSABF_0 for CA section 0 and CA section 1 (e.g. identified in the FIG. 7 by a circled number 1).

At time T4, a propagating control signal BLISO_1 of the BLSABF_1 is enabled (e.g., BLISO_1 is VDD), and sensing control of the BLSABF_1 is enabled. The sensing control of the BLSABF_1 starts before the end of the first sensing or latch period of the BLSABF_0. Since the sensing or latch control signal SEN_0 is maintained at the activated state at time T4, the latch circuit of the BLSABF_0 still latches the sensed/amplified data voltage signal such that the data voltage signal loaded on the bit-line BL_1 (or bit-line pair BL_1/BLf_1) in the CA section 1 is driven by the sensing or latch circuit of the BLSABF_0. The propagating control circuit of the BLSABF_1 is configured to pass the data voltage signal loaded on the bit-line BL_1 (or bit-line pair BL_1/BLf_1) in the CA section 1 and driven by the sensing or latch circuit of the BLSABF_0, and transfer the data voltage signal onto the bit-line BL_2 (or bit-line pair BL_2/BLf_2) in the CA section 2 during a second propagating period (e.g., from period T4 to T6). The beginning (e.g., T4) of the second propagating period of the BLSABF_1 is after the first propagating period and before the end of the first sensing or latch period of the BLSABF_0. In addition, the bit-line (or bit-line pair) in the CA section 0 may be pre-charged to a first supply voltage before the word line WL in the CA section 0 is activated and after the first propagating period. The bit-line in the CA section 1 may be pre-charged to the first supply voltage before the first sensing or latch period and after the second propagating period.

At time T5, a sensing or latch control signal SEN_1 of the BLSABF_1 is enabled (e.g., SEN_1 is VDD), and the latch circuit of the BLSABF_1 is configured to latch the sensed/amplified data voltage signal during a second sensing or latch period (e.g., from period T5 to T8). The BLSABF_1 is enabled, and the data voltage signal is transferred from the bit-line BL_1 (or bit-line pair BL_1/BLf_1) in the CA section 1 to the bit-line BL_2 (or bit-line pair BL_2/BLf_2) in the CA section 2, and the sensed/amplified data voltage signal from the bit-line BL_1 (or bit-line pair BL_1/BLf_1) in the CA section 1 may be latched in the latch circuit of the BLSABF_1 during the second sensing or latch period. As such, page data is copied from the CA section 1 to BLSABF_1 for CA section 1 and CA section 2 (e.g., identified in the FIG. 7 by a circled number 2).

At time T7, a propagating control signal BLISO_2 of the BLSABF_2 is enabled (e.g., BLISO_2 is VDD). The propagating control circuit of the BLSABF_2 is configured to sense the data voltage signal loaded on the bit-line BL_2 (or bit-line pair BL_2/BLf_2) in the CA section 2 and driven by the sensing or latch circuit of the BLSABF_1, and transfer the data voltage signal onto the bit-line BL_3 (or bit-line pair BL_3/BLf_3) in the CA section 3 during a third propagating period (e.g., from period T7 to T9). At time T8, a sensing or latch control signal SEN_2 of the BLSABF_2 is enabled (e.g., SEN_2 is VDD), and the latch circuit of the BLSABF_2 is configured to latch the sensed/amplified data voltage signal during a third sensing or latch period (e.g., from period T8 to T11). The BLSABF_2 is enabled, page data is copied from the CA section 2 to the BLSABF_2 for CA section 2 and CA section 3 (e.g., identified in the FIG. 7 by a circled number 3).

At time T10, a propagating control signal BLISO_3 of the BLSABF_3 is enabled (e.g., BLISO_3 is VDD). The propagating control circuit of the BLSABF_3 is configured to sense the data voltage signal loaded on the bit-line BL_3 (or bit-line pair BL_3/BLf_3) in the CA section 3 and driven by the sensing or latch circuit of the BLSABF_2, and transfer the data voltage signal onto the bit-line BL_4 (or bit-line pair BL_4/BLf_4) in the CA section 4 during a fourth propagating period (e.g., from period T10 to T12). At time T11, a sensing or latch control signal SEN_3 of the BLSABF_3 is enabled (e.g., SEN_3 is VDD), and the latch circuit of the BLSABF_3 is configured to latch the sensed/amplified data voltage signal during a fourth sensing or latch period (e.g., from period T11 to T14). The BLSABF_3 is enabled, page data is copied from the CA section 3 to the BLSABF_2 for CA section 3 and CA section 4 (e.g., identified in the FIG. 7 by a circled number 4).

In addition, the bit-line (or bit-line pair) in the CA section 2 may be pre-charged to the first supply voltage before the second sensing or latch period and after the third propagating period. The bit-line (or bit-line pair) in the CA section 3 may be pre-charged to the first supply voltage before the third sensing or latch period and after the fourth propagating period. The bit-line (or bit-line pair) in the CA section 4 may be pre-charged to the first supply voltage before the fourth sensing or latch period.

At time T13, a signal-pass control signal BLISO_U of the page buffer 132 is enabled (e.g., BLISO_U is VDD). The signal-pass control circuit of the page buffer 132 is configured to sense the data voltage signal loaded on the bit-line BL_4 (or bit-line pair BL_4/BLf_4) in the CA section 4 and driven by the sensing or latch circuit of the BLSABF_3 during a signal-pass period (e.g., from period T13 to T15). At time T14, a sensing/latch control signal SEN_U of the page buffer 132 is enabled (e.g., SEN_U is VDD), and the buffer circuit of the page buffer 132 is configured to latch the sensed/amplified data voltage signal during a sensing/latch period (e.g., from period T14 to T16). The page buffer 132 is enabled, and page data is copied from the CA section 4 to the page buffer 132. As such, through the signal sensing and buffering performed by the BLSABF_0-BLSABF_3, data voltage signals on the bit-line BL_0 (or bit-line pair BL_0/BLf_0) in the CA section 0 may be transferred to the page buffer 132 by sequentially propagated across BLSABF_0, CA section 1, BLSABF_1, CA section 2, BLSABF_2, CA section 3, BLSABF_3, CA section 4.

Please further refer to FIG. 5A, the page buffer module 130 may further include a logic operation processing circuit 134 coupled to the page buffer 132. The logic operation processing circuit 134 is configured to receive the data voltage signal (hereinafter referred to as page-copy accessed data) latched in the page buffer 132 and perform a bit-wise multiplication operation on the page-copy accessed data. The logic operation processing circuit 134 includes a source transistor M17 and transistors M18_a-M18_d. The source transistor M17 and transistors M18_a-M18_d may be MOS transistors or other devices having similar functions. For example, the source transistor M17 and transistors M18_a-M18_d may be PMOS or NMOS transistors. The control terminal of the source transistor M17 is coupled to the page buffer 132. The transistors M18_a-M18_d are connected in parallel. The number of the parallel-connected transistors may be varied and designed according to practical system demands. The first terminals of the transistors M18_a-M18_d are coupled to the first terminal of the source transistor M17. The control terminals of the transistors M18_a-M18_d are coupled to selection signals X0-X3, respectively. The second terminals of the transistors M18_a-M18_d are coupled to data bit lines DLa to DLd, respectively. When the data voltage signal (hereinafter referred to as page-copy accessed data) is latched in the buffer circuit 1324 of the page buffer 132, the latched data (page-copy accessed data) may be passed to the control terminal of the source transistor M17. Each of the transistors M18_a-M18_d connected to the source transistor M17 may sink current when both the source transistor and the source-transistor-connected transistors, M18_a-M18_d, are turned on (in a "ON" state). This arrangement may be utilized as a component of bit-wise operation. Moreover, through the control of the selection signals X0-X3, bit-wise multiplication results may be outputted from the logic operation processing circuit 134.

The CA sections 134 near the page buffers may be assigned as cache memories for rapid access into arithmetic operations. Each of the memory cell arrays comprise row decoders (and may comprise column decoders) coupled to the memory cell array. Through predetermined decoding sequences of the decoders, bit-wise multiplication results, which would be part of the arithmetic/logic operations in the convolutional neural network is accomplished in conjunction with arithmetic operations, can be executed in the logic operation processing circuit 134.

A page of data from the top cell array is accessed utilizing the page-copy scheme and stored in the page buffers adjacent to the logic operation processing circuit 134. The logic operation processing circuit 134 may process conditionally accessed data stored in a page buffer and stores the result in another page buffer. After that, the stored result data is subsequently stored in the cell array utilizing the page-copy scheme. The data flow can be repeated as often as necessary to complete processing of the localized dataflow without requiring any long distance transfer of data.

The conditionally accessed dataflow alluded to above is meant to further reduce data transfers, energy consumed for data movement, and complexities by using addition to replace multiplication in the processing of each layer. This is done with the use of page data buffers, such as shown in FIG. 5A.

Figure 5B:
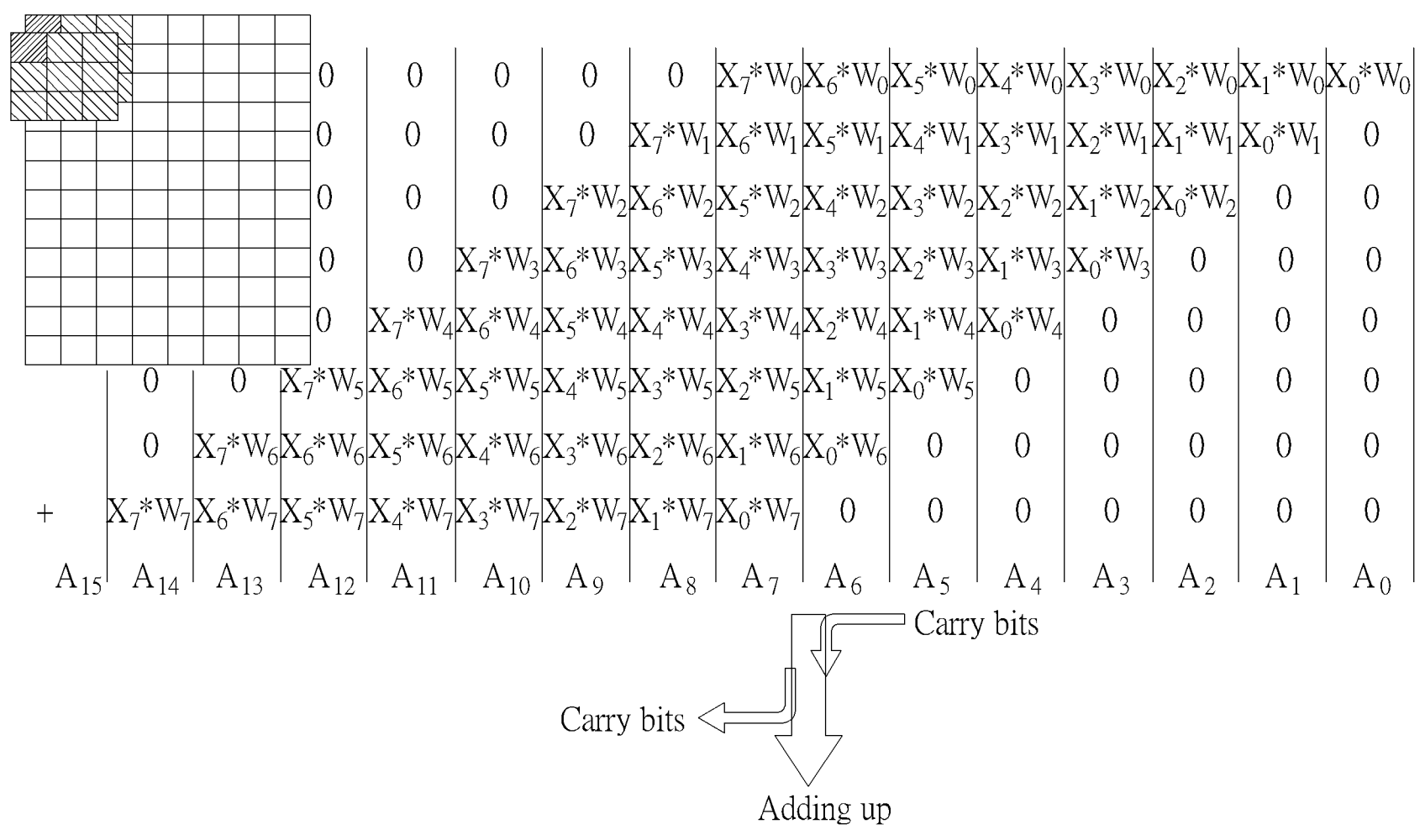

Please refer to FIG. 5B. FIG. 5B is a schematic diagram illustrating replacement of multiplication by addition of a plurality of bit-wise multiplication results when multiplying vectors according to an embodiment of the present invention. This requires the sum of Xi*Wj. It is noted that the bit, Xi*Wj, means the product of two bits, Xi and Wj.

The accumulation of the data from the logic operation processing circuit 134 as a multiplication result may then be copied to the page buffers of the in-situ processing block or to the page buffers in the neighboring processing block. As data transfers constitute as much as 90-99% of power used in a convolutional neural network, this method of page-copy in parallel and in conjunction with conditional access results in a significant power savings.

In short, the conditionally accessed data includes the access of Wi (the page data stored in a row of a memory cell array) through the activation of a selection bit represented as Xj, such that the accessed data is Wi*Xj (i.e. bit Wi AND with bit Xj) instead of a native Wi, and the summation of the conditionally accessed data, Xi*Wj, in a specific arrangement is equal to the multiplication of two vectors, X*W. Additionally, the conditionally accessed data includes the access of Wi (the page data stored in a row of a memory cell array) through the activation of a multiple number of bits represented as (Xj, Xj+1, Xj+2, . . . ) are (Wi*Xj, Wi*Xj+1, . . . ), and the summation of these conditionally accessed data in a specific arrangement is equal to the multiplication of two vectors, X*W.

Figure 9A:
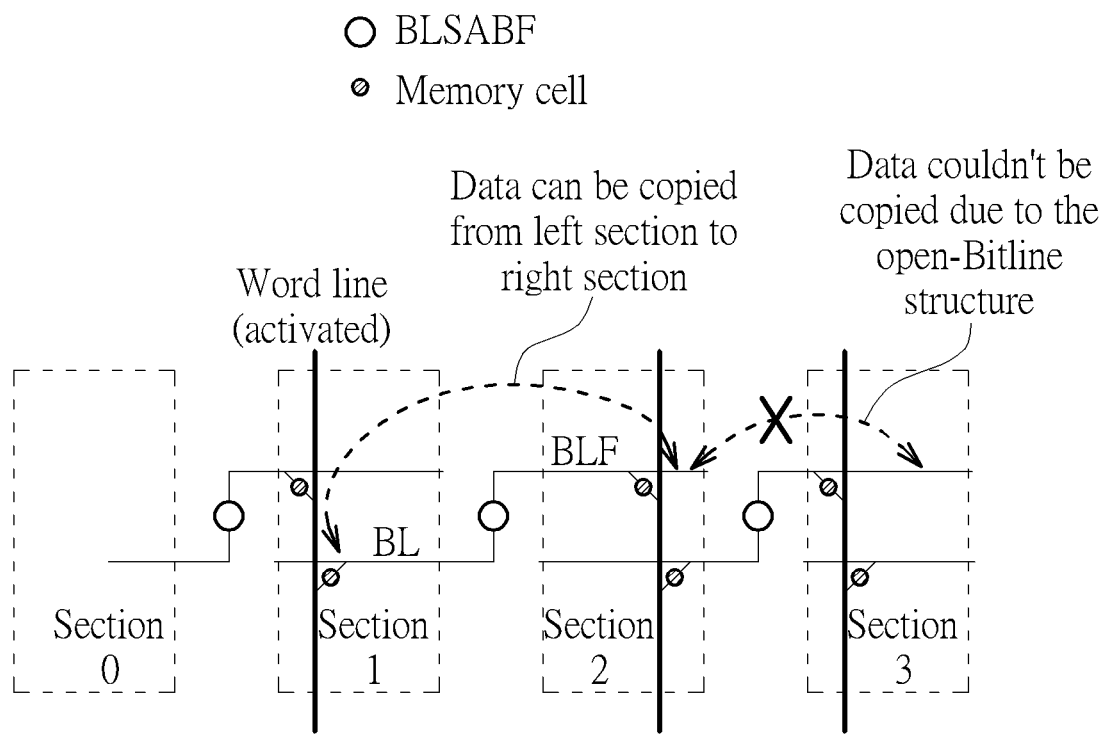
FIG. 9A illustrate data copy in a conventional open-bit-line array of memory sections.
Figure 9B:
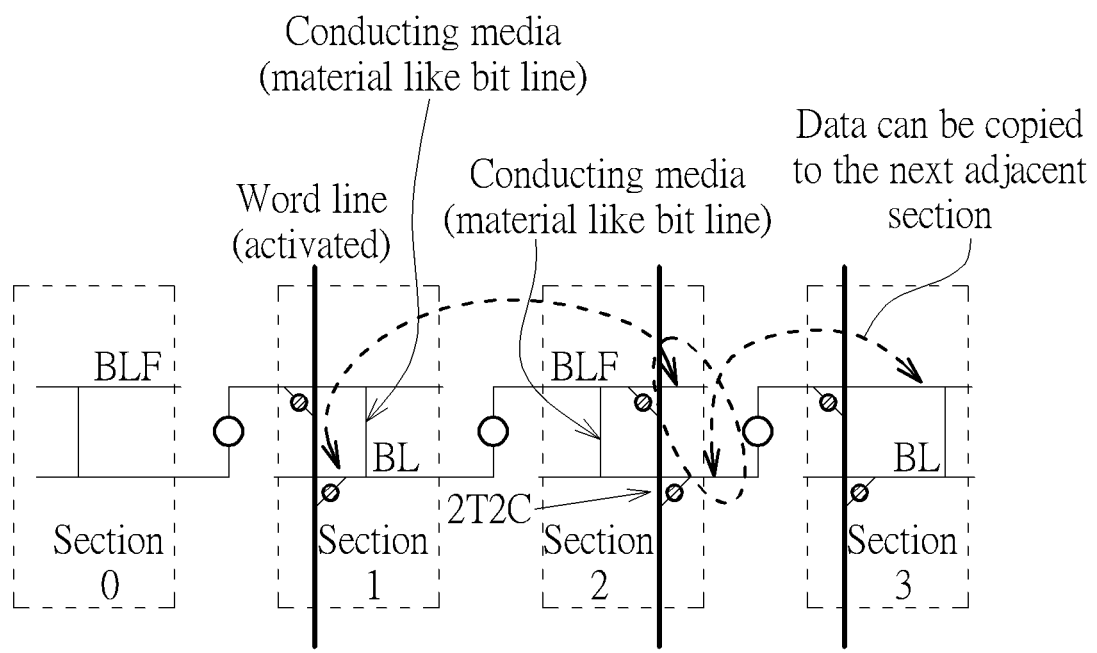
FIG. 9B illustrates data copy in a 2T2C cell array (modified from a conventional 1T1C open-bit-line array).
Figure 9C:
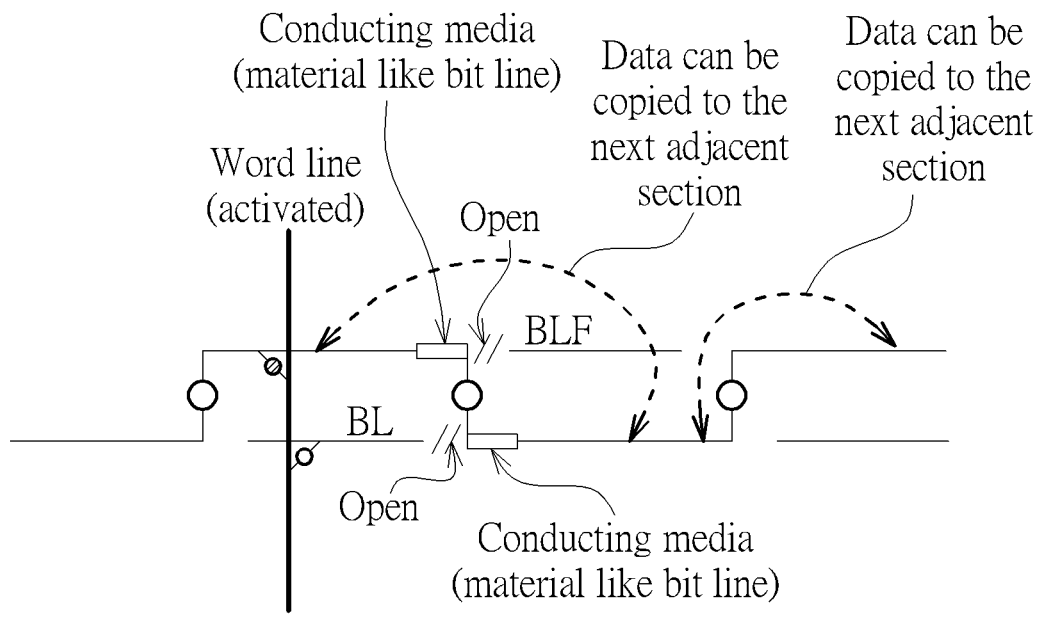
FIG. 9C illustrates data copy in a 1T1C cell array (modified from a conventional 1T1C open-bit-line array).

FIGS. 9A and 9B illustrate data copy in a conventional open-bit-line array of memory sections and a modified CA sections. The disclosed data copy scheme may fail (for example from CA section 2 to CA section 3 in FIG. 9A) in the conventional open-bit-line array shown in FIG. 9A because the data cannot always be copied due to the open-bit-line structure. To solve this problem, FIG. 9B shows a structural modification of the open-bit-line array by forming an electrical link connecting the first and second bit-lines in each memory cell array section. This modification ensures that the data stored in a preceding BLSABF will always be possible to a subsequent BLSABF and the subsequent CA section. FIG. 9C illustrates data copy in a 1T1C cell array (modified from a conventional 1T1C open-bit-line array).

Figure 10:
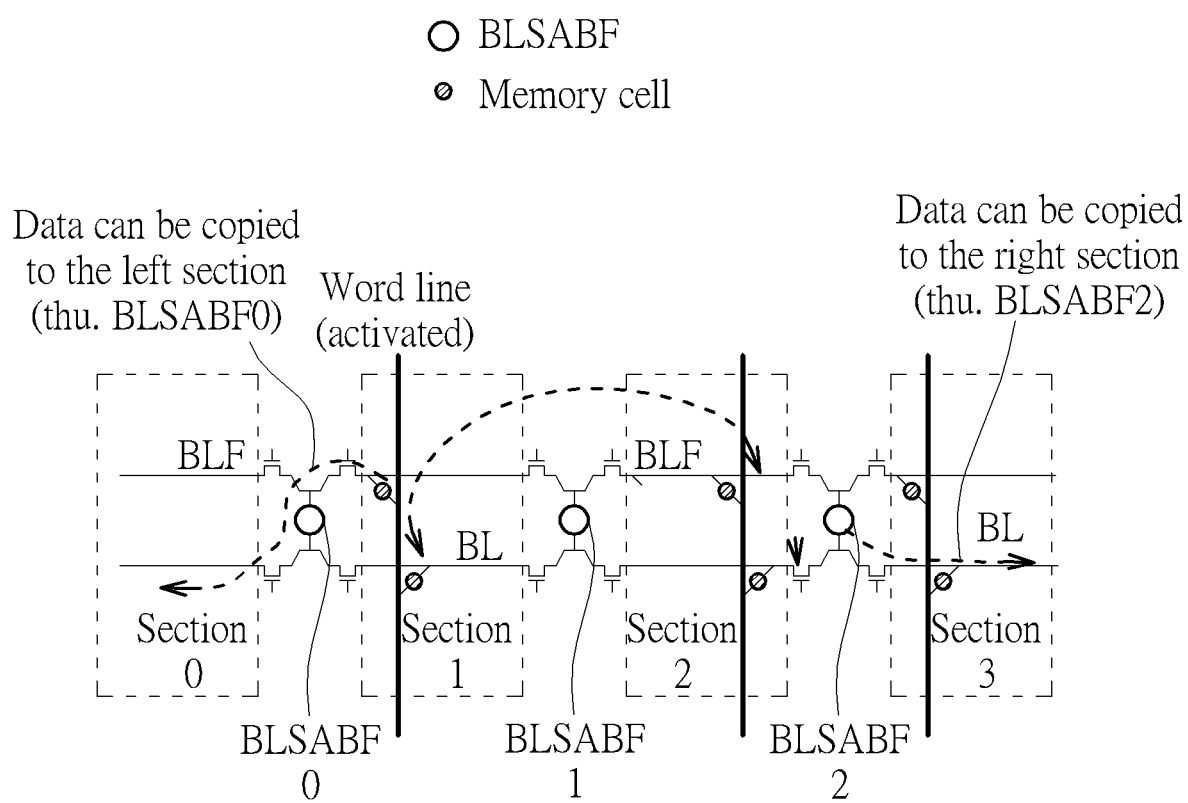
FIG. 10 illustrates another implementation of data copy in a 1T1C cell array (modified from a conventional 1T1C open-bit-line array).

FIG. 10 illustrates another possible page-copy array structural modification of the open-bit-line array. In FIG. 10, each BLSABF is connected to four transistors, each transistor having a first terminal, a second terminal, and a control terminal. A first bit line in one memory section is coupled to the first terminal of the first transistor, the second terminal of the first transistor, a first node, to the first terminal of the second transistor, the second terminal of the second transistor to a first bit line in the adjacent memory section in series as shown in FIG. 10. A second bit line in the one memory section is coupled to the first terminal of the third transistor, the second terminal of the third transistor, a second node, to the first terminal of the fourth transistor, the second terminal of the fourth transistor, to a second bit line in the adjacent memory section in series, and a BLSABF is coupled to the first node and to the second node also as shown in FIG. 10. Each of the four transistors can be controlled to electrically connect the BLSABF with bit lines (or bit-line pairs) in the adjacent CA sections, ensuring the desired propagation of data voltages.

Figure 11:
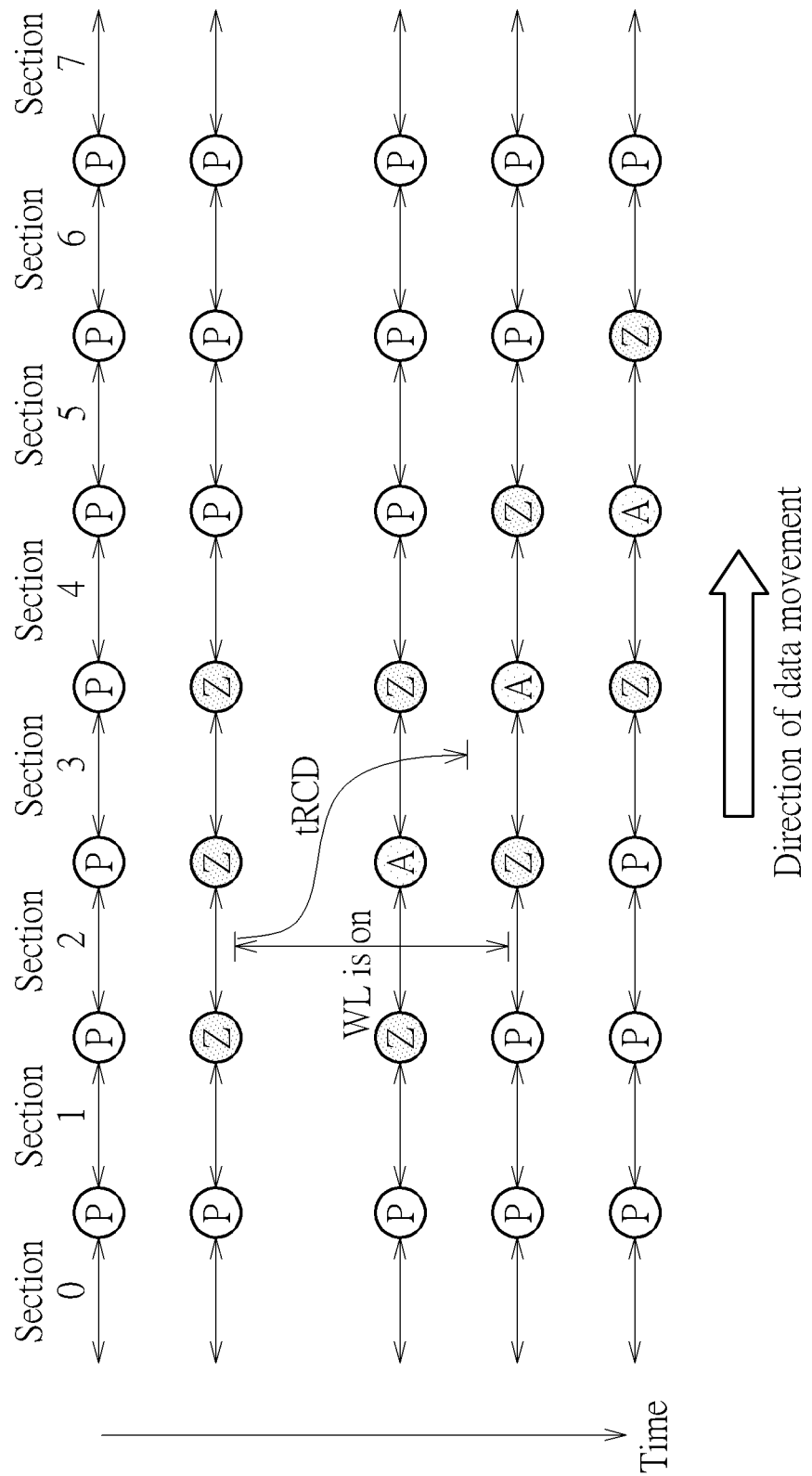
FIG. 11 shows an example operation of a data copy in a conventional open-bit-line array with inter-sectional movement of page data.

FIG. 11 shows an example operation of a data copy in a conventional open-bit-line array with inter-sectional movement of page data. In FIG. 11, time shifts from top to bottom in the drawing, and data is copied from the left to the right as time progresses. In FIG. 11, after pre-charging the bit lines (or bit-line pairs) in CA section 2, the word line in CA section 2 is activated, reading and amplifying data from the memory cells and latching the data (labeled as "A" in the drawings) in the appropriate BLSABF. As shown, the word line can then be turned off. When the subsequent BLSABF is activated, the data "A" is copied from the current BLSABF to the subsequent BLSABF as shown. The BLSABF activation process continues, propagating the data "A" from one BLSABF to a next BLSABF until a target location is reached.

Some of the benefits of this page-copy scheme include:
1. Harvesting the maximum pre-fetch of data a DRAM array can provide.
2. Potentially discarding the use of second stage data sense amplifier, which is also called data line sense amplifiers, and saving the power consumption of an unnecessary column select line decoder.
3. Power savings due to the inherently lower voltage swing for bit lines or bit-line pairs.
4. Accommodating a BL-before-WL page-data write scheme to achieve very fast and low-power data writing.

Figure 12:
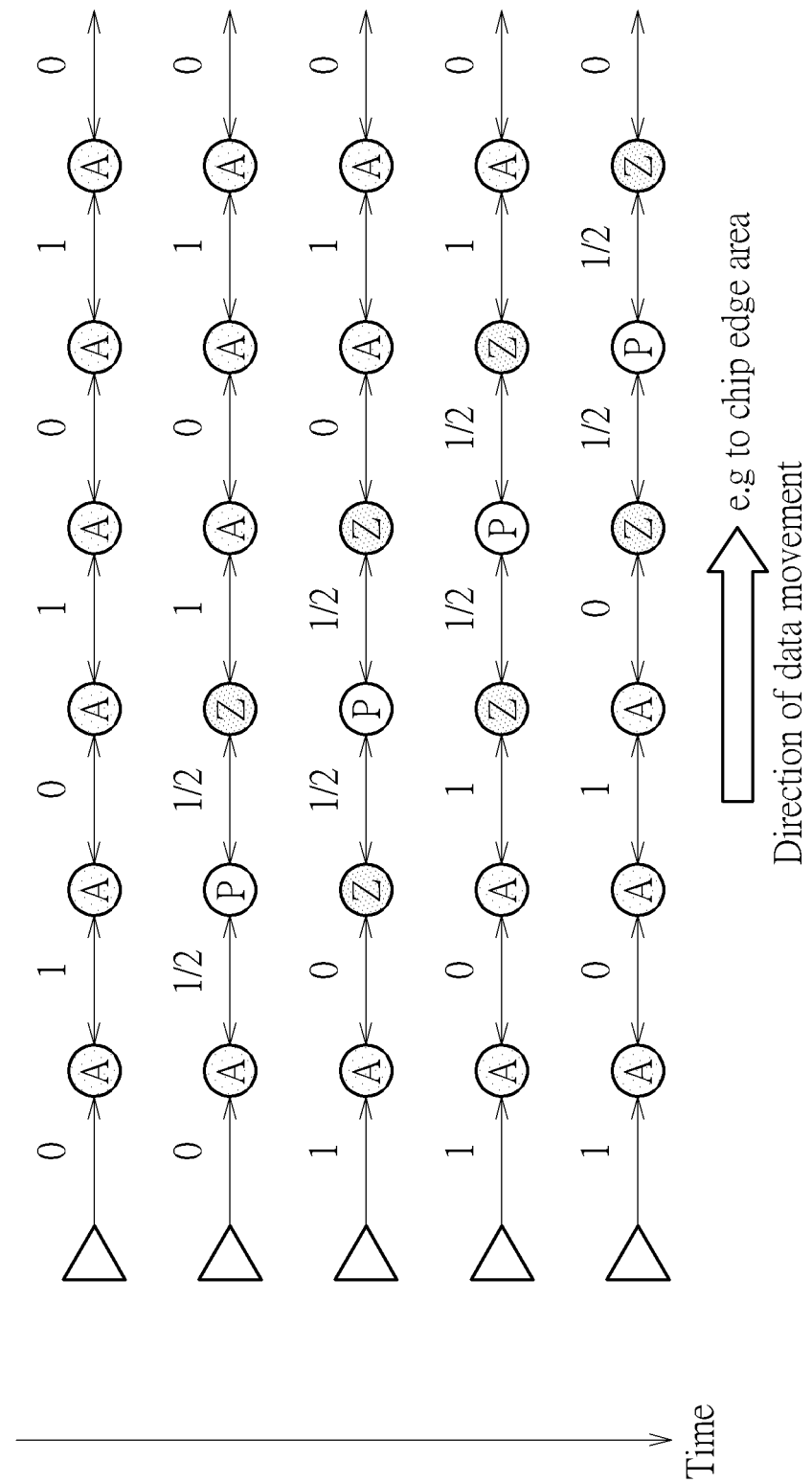
FIG. 12 illustrates application of the array data access scheme to a bank peripheral.

FIG. 12 illustrates application of the array data access scheme to a chip peripheral—the long-range, wide-bus, power-efficiency data movement scheme.

FIG. 12 is similar in notation to FIG. 11, except that FIG. 12 shows the voltage signals being propagated across the data buffers in peripheral.

In summary, the scheme of the embodiment of the invention may be applied as a method of page data write access in a memory chip, of which page data may be propagated sequentially from section to subsequent adjacent section until a target location is reached, and then, activating a word line in a section of the memory comprising the target location to write voltages to the memory cells at the target location. In other words, through the sensing and buffering of the BLSABFs and page buffers, page data can be propagated sequentially from a section/page buffer to the page buffer/section based on the page-data-copy scheme, thus improving the energy efficiency of data movement in the memory module and the utility of the accompanied operation logics.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for page-copy data accessing, comprising:
a memory cell array, divided into a plurality of memory sections, each memory section comprising a plurality of memory cells which are partitioned into multiple pages and each page of memory cells is coupled by a corresponding word line,
a plurality of bit-line sense-amplifier/buffers (BLSABFs), coupled to the memory cell array through a plurality of bit-lines or bit-line pairs, each BLSABF being coupled to two bit-lines or bit-line pairs located in the two different memory sections on opposite sides of the BLSABF, data voltage signals on the bit-lines or bit-line pairs in a memory section, by the signal sensing and buffering performed by the plurality of BLSABFs, are transferred to the bit-lines or bit-line pairs in an adjacent memory section adjacent to the memory section, the voltage data signals are sequentially propagated across
a plurality of subsequent memory sections through a plurality of BLSABFs, which are coupled to two adjacent memory sections of the subsequent memory sections, wherein each of the plurality of BLSABFs comprises:
a propagating control circuit, coupled to a bit-line or bit-line pair in the memory section and a bit-line or bit-line pair in the adjacent memory section adjacent to the memory section, configured to transfer a data voltage signal in the memory section/adjacent memory section to a bit-line or bit-line pair in the adjacent memory section/memory section in response to a propagating control signal; and a latch circuit, coupled to the bit-line or bit-line pair in the memory section and the adjacent memory section, and configured to sense the data voltage signal and latch the sensed/amplified data voltage signal in response to a sensing or latch control signal;

a plurality of page buffers, coupled to all of or part of the plurality of BLSABFs, and configured to receive the data voltage signals from the coupled BLSABFs to a data interface of the apparatus, or configured to store data voltage signals from the data interface of the apparatus to the coupled BLSABFs; and a logic operation processing circuit, coupled to the plurality of page buffers and configured to receive the data voltage signals from the plurality of page buffers and perform a bit-wise multiplication operation on the data voltage signals.

2. The apparatus of claim 1, wherein the memory cell array, which comprising a plurality of memory sections, comprises static-random-access memory (SRAM), dynamic random access memory (DRAM), flash memory, magneto-resistive random-access-memory (MRAM), ferroelectric random-access memory (FeRAM) or Resistive Random Access Memory (RRAM) cell arrays.

3. The apparatus of claim 1, wherein a word line is activated, a sensing control of a first BLSABF of the plurality of BLSABFs is enabled and the BLSABF is configured to sense a data voltage signal from a memory cell coupled to the word line to a bit-line or bit-line pair in a first memory section associated with the first BLSABF, and then transfer the sensed/amplified data voltage signal through the propagating control circuit of the first BLSABF onto a bit-line or bit-line pair in a second memory section adjacent to the first memory section during a first propagating period, and a first latch circuit of the first BLSABF is configured to latch the sensed/amplified data voltage signal in response to a first sensing or latch control signal during a first sensing or latch period.

4. The apparatus of claim 3, wherein a beginning of the first sensing or latch period is between the first propagating period, the data voltage signal has been transferred onto the bit-line or bit-line pair in the second memory section in the first propagating period.

5. The apparatus of claim 4, wherein a beginning of the second propagating period is before an end of the first sensing or latch period when the data voltage signal has been transferred onto the bit-line or bit-line pair in the second memory section and a second data sensing starts before the end of the first sensing or latch period, and a beginning of the second sensing or latch period is between the second propagating period and after the first propagating period.

6. The apparatus of claim 3, wherein the bit-line or bit-line pair in the first memory section is pre-charged to a first supply voltage before a word line in the first memory section is activated or before a data voltage signal is transferred from a neighboring or the second section through the propagating control circuit associated with the bit-line or bit-line pair in the neighboring or second memory section.

7. The apparatus of claim 3, wherein a second propagating control circuit of a second BLSABF is enabled to transfer the data voltage signal driven by the sensing or latch circuit of the first BLSABF onto a bit-line or bit-line pair of a memory cell in a third memory section adjacent to the first and third memory sections during a second propagating period, and a sensing or latch circuit of the second BLSABF is enabled and configured to sense and latch the sensed/amplified data voltage signal on the bit-line or bit-line pair in the second memory section in response to a second sensing or latch control signal during a second sensing or latch period.

8. The apparatus of claim 7, wherein the bit-line or bit-line pair in the second memory section is pre-charged to a first supply voltage before a word line in the second memory section is activated or before a data voltage signal is transferred from a neighboring section through the propagating control circuit associated with the bit-line or bit-line pair in the neighboring memory section.

9. The apparatus of claim 1, wherein each of the propagating control circuit comprises:

a first transistor or transistor pair, comprising a first terminal or terminal pairs coupled to the bit-line or bit-line-pair of the memory cell in the memory section and configured to transfer the data voltage signals, a control terminal or terminal pair controlled by the propagating control signal, and a second terminal or terminal pair coupled to the bit-line or bit-line pair of the memory cell in the adjacent memory section.

10. The apparatus of claim 9, wherein each of the latch circuit comprises:

a second transistor, comprising a first terminal coupled to a power supply voltage, a control terminal, and a second terminal;

a third transistor, comprising a first terminal coupled to the second terminal of the second transistor, a control terminal coupled to the control terminal of the second transistor, and a second terminal;

a fourth transistor, comprising a first terminal coupled to the power supply voltage, a control terminal coupled to the second terminal of the second transistor and the first terminal of the third transistor, and a second terminal coupled to the control terminals of the second transistor and the third transistor, wherein at least one of the second terminals of the second transistor and fourth transistor is coupled to the bit-line or bit-line pair of the memory cell in the adjacent memory section;

a fifth transistor, comprising a first terminal coupled to the second terminal of the fourth transistor and the control terminal of the second transistor, a control terminal coupled to the control terminal of the fourth transistor, and a second terminal; and a sixth transistor, comprising a first terminal coupled to the second terminals of the third transistor and the fifth transistor, a control terminal controlled by the sensing or latch control signal, and a second terminal.

11. The apparatus of claim 1, wherein each of the plurality of page buffers comprises:

a signal-pass control circuit, coupled to a bit-line or bit-line pair which is coupled to a BLSABF, and configured to sense or transfer a data voltage signal from/to the coupled BLSABF through the bit-line or bit-line pair of the coupled BLSABF in response to a signal-pass control signal; and a buffer circuit, coupled to the signal-pass control circuit, and configured to latch the sensed/amplified data voltage signal in response to a sensing/latch control signal.

12. The apparatus of claim 11, wherein the signal-pass control circuit is enabled and configured to transfer the data voltage signal from the last stage of the plurality of BLSABFs or transfer the data voltage signal to the last stage of the plurality of BLSABFs via the bit-line or bit-line pair coupled to the last stage of the plurality of BLSABFs in response to the signal-pass control signal during a signal-pass period, and the buffer circuit is enabled and configured to latch the sensed/amplified data voltage signal in response to the sensing/latch control signal during a sensing/latch period.

13. The apparatus of claim 12, the sensing/latch period overlaps with the signal-pass period.

14. The apparatus of claim 12, the bit-line or bit-line pair coupled to the last stage of the plurality of BLSABFs is pre-charged to a first supply voltage before a beginning of the sensing/latch period or before a data voltage signal is transferred from a neighboring section through the signal-pass control circuit associated with the bit-line or bit-line pair coupled to the last stage of the plurality of BLSABFs.

15. The apparatus of claim 11, wherein the signal-pass control circuit is enabled and configured to transfer the data voltage signal from the buffer circuit to the last stage of the plurality of BLSABFs during a sensing/latch period.

16. The apparatus of claim 11, wherein the signal-pass control circuit comprises:
a seventh transistor or transistor pair, comprising a first terminal or terminal pair coupled to the bit-line or bit-line pair which is coupled to the last stage of the plurality of BLSABFs and configured to transfer the data voltage signal, a control terminal or terminal pair controlled by the signal-pass control signal, and a second terminal or terminal pair.

17. The apparatus of claim 16, wherein the buffer circuit comprises:
an eighth transistor, comprising a first terminal coupled to a power supply voltage, a control terminal, and a second terminal;
a ninth transistor, comprising a first terminal coupled to the second terminal of the eighth transistor, a control terminal coupled to the control terminal of the eighth transistor, and a second terminal;
a tenth transistor, comprising a first terminal coupled to the power supply voltage, a control terminal coupled to the second terminal of the eighth transistor and the first terminal of the ninth transistor, and a second terminal coupled to the control terminals of the eighth transistor and the ninth transistor, wherein at least one of the second terminals of the eighth transistor and tenth transistor is coupled to the second terminal or terminal pair of the seventh transistor or transistor pair;
an eleventh transistor, comprising a first terminal coupled to the second terminal of the tenth transistor, a control terminal coupled to the control terminals of the tenth transistor, and a second terminal;
a twelfth transistor, comprising a first terminal coupled to the second terminals of the ninth transistor and the eleventh transistor, a control terminal controlled by the sensing/latch control signal, and a second terminal;
a thirteenth transistor, comprising a first terminal coupled to the second terminal of the eighth transistor, a control terminal, and a second terminal;
a fourteenth transistor, comprising a first terminal coupled to the second terminal of the tenth transistor, a control terminal, and a second terminal; and
an inverter, comprising an input terminal coupled to the second terminal of the fourteenth transistor, and an output terminal coupled to the second terminal of the thirteenth transistor.

18. The apparatus of claim 1, wherein the write access of a data to a memory cell, which is associated to a word line in a memory section, comprising the timing sequence that a data voltage signal has been driven to a bit-line or bit-line pair before activating of the associated word line.

19. The apparatus of claim 1, wherein the logic operation processing circuit comprises:
a source transistor, comprising a first terminal, a control terminal coupled to a page buffer, and a second terminal; and
a plurality of fifteen transistors, connected in parallel to each other, each comprising a first terminal, a second terminal and a control terminal,
wherein the first terminals of the plurality of fifteen transistors are coupled to the first terminal of the source transistor.

20. The apparatus of claim 19, wherein the data voltage signal latched in the page buffer is then passed to the control terminal of the source transistor, and each of the plurality of fifteen transistors connected to the source transistor sinks current when both the source transistor and the plurality of fifteen transistors are turn on.

* * * * *